Feb. 23, 1960     E. H. BLATTNER     2,925,892
AUTOMATIC HYDRAULIC SLACK ADJUSTER
Filed Dec. 28, 1956                              2 Sheets-Sheet 1
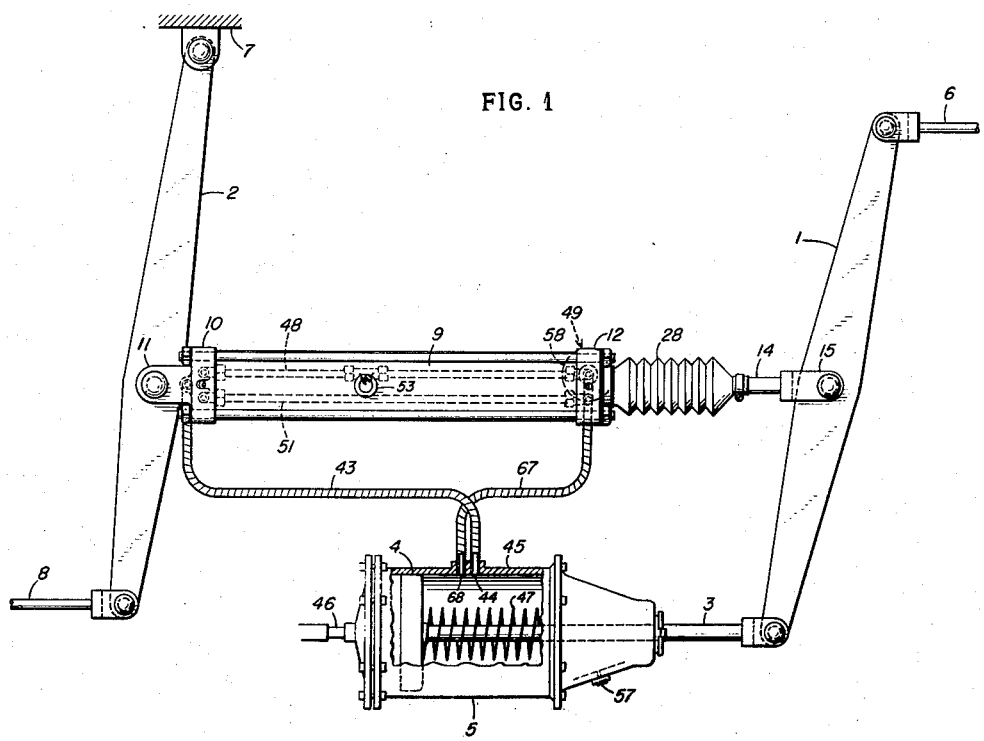
Inventor:
Emil H. Blattner
By Wilmer Mechlin
his Attorney

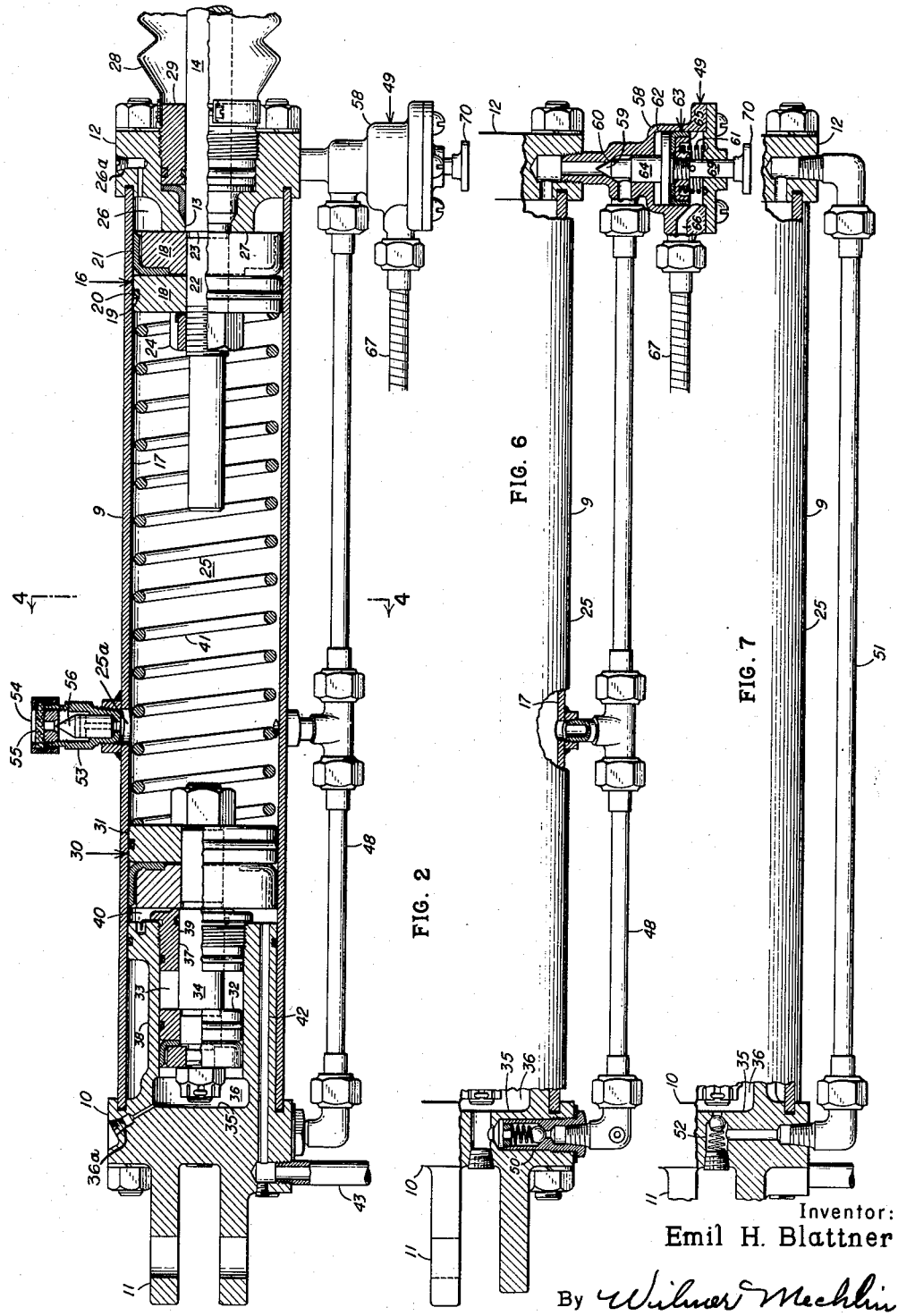

United States Patent Office 2,925,892
Patented Feb. 23, 1960

2,925,892
AUTOMATIC HYDRAULIC SLACK ADJUSTER

Emil H. Blattner, Williamsville, N.Y., assignor to Symington Wayne Corporation, a corporation of Maryland Application December 28, 1956, Serial No. 631,644

18 Claims. (Cl. 188—198)

This invention relates to an automatic hydraulic slack adjuster for railway brake rigging.

The primary object of the invention is to provide an improved automatic hydraulic slack adjuster whereby an application of brakes when the slack in the brake rigging is excessive causes a charge of liquid to be applied to an adjusting unit in a linkage between a pair of brake levers to shorten the linkage and take up slack.

Another object of the invention is to provide an improved automatic hydraulic slack adjuster having power and adjusting units, the power unit, when the slack is excessive, drawing a charge from a liquid reservoir and impressing it on an adjusting unit to take up slack by shortening a linkage between a pair of brake levers, and the adjusting unit, when the slack is insufficient, returning liquid to the reservoir to pay out slack by lengthening the linkage.

An additional object of the invention is to provide an improved automatic hydraulic slack adjuster wherein the several units are mountable as a single assembly in the linkage between a pair of brake levers, thereby reducing to a minimum the number of fluid connections between relatively movable members.

A further object of the invention is to provide an improved automatic hydraulic slack adjuster which operates automatically under line pressure to take up and pay out slack and is manipulable in the absence of line pressure to vary the slack as needed for maintenance or repair of the brake rigging.

Another object of the invention is to provide an automatic hydraulic slack adjuster for adjusting the slack in a brake rigging by varying the length of a linkage between a pair of brake levers, the slack adjuster being so arranged and constructed as effectively to fix the length of the linkage on a brake application with normal slack.

Other objects and advantages of the invention will appear hereinafter in the detailed description, be particularly pointed out in the appended claims and be illustrated in the accompanying drawings, in which Figure 1 is a plan view of a portion of a railway brake rigging embodying a preferred form of the automatic slack adjuster of the present invention;

Figure 2 is a longitudinal vertical sectional view on an enlarged scale of the housing and associated parts of the slack adjuster of Figure 1;

Figure 3 is an end elevational view of the slack adjuster on the same scale as and taken from the left end of Figure 2;

Figure 4 is a vertical sectional view taken along the lines 4—4 of Figure 2;

Figure 5 is an end elevational view of the slack adjuster taken from the end opposite that shown in Figure 3 and through the intervening portion of the rod connected to the brake lever;

Figure 6 is a fragmentary side elevational view of the structure of Figure 2 with portions broken away and shown in a section taken along the lines 6—6 of Figure 3; and Figure 7 is a fragmentary side elevational view of the structure of Figure 2 with portions broken away and shown in a section taken along the lines 7—7 of Figure 3.

The slack adjuster of the present invention is composed, essentially, of three units, a power unit, an adjusting unit and a reservoir, the power unit being active only when the slack is excessive and then taking on a charge of fluid from the reservoir coincident with a brake application and on subsequent release of the brakes impressing that charge on the adjusting unit to shorten the linkage between a pair of brake levers. The adjusting unit in turn is inactive and fixes or holds the length of the linkage constant when the slack is normal. However, when the slack is below normal, the adjusting unit is capable of forcing fluid back to the reservoir so as to pay out slack until the latter is restored to normal.

Since dependent for their interaction on fluid connections, the three basic units may be housed separately or the reservoir may be housed with one or both of the other units. In any case, the stroke of the brake piston on a brake application is depended on to actuate the power unit, either mechanically or by fluid pressure. Thus the power unit may have its piston connected by a lost motion connection to the brake piston, the lost motion being such as to actuate the power unit only when the stroke of the brake piston is in excess of that required for normal slack. Alternatively, the power unit may be actuated by line pressure applied to it on a like excessive stroke of the brake piston. The alternative fluid-actuated power unit more readily lends itself to a relatively simple, compact embodiment of the slack adjuster of the present invention and it is such an embodiment that has been selected for purposes of illustration and will now be described.

Referring now in detail to the drawings, wherein like reference characters designate like parts, the preferred embodiment of the slack adjuster therein illustrated, while adaptable for installation in a linkage between a pair of brake levers, as are at least the adjusting units of the alternative forms, has been illustrated as linking or connecting the intermediate portions of a brake cylinder lever 1 and an associated floating lever 2 in place of the conventional center pull rod. In the illustrated application, the cylinder lever 1 is pivotally connected at one end to the push rod 3 of a brake piston 4 mounted for reciprocation in the usual brake cylinder 5, the opposite end of the cylinder lever being connected by a pull rod 6 to a related brake lever (not shown). In turn, the associated floating lever is deaded at one end to the underframe or other fixed part 7 of a car body (not shown) and at the other is connected by a pull rod 8 to a related brake lever (not shown).

Combining the several basic units of the automatic hydraulic slack adjuster of the present invention in a single assembly, the illustrated slack adjuster is comprised of a single cylindrical housing, casing or cylinder 9 capped at either end by a pair of caps or end closure members or blocks, one, 10, being pivotally connected as by a pair of apertured jaws 11 rigid therewith to the intermediate portion of one of the brake levers, here the floating lever 2, and the other, 12, having a central or axial bore 13 in which slides or seats a connecting rod 14 reciprocable relative to the housing 9, the rod 14 carrying at its outer end a clevis or the like 15 through which it is pivotally connected to the intermediate portion of the other, here the cylinder lever 1.

The connecting rod 14 within the casing 9 inwardly of the cap 12 through which it extends carries a main or adjusting piston 16 which slides or reciprocates on the inner wall 17 of the casing and is given fluid-tight or sealing engagement therewith as by making the piston in the form of a pair of abutting discs or collars 18, the inner carrying in a peripheral groove 19 an O-ring 20 and the other or outer carrying a gasket or packing cup 21, the O-ring and gasket wiping against the inner wall of the casing. While desirably detachable from the connecting rod 14, the piston 16 is designed to move longitudinally or axially therewith, this conveniently being provided by mounting the centrally apertured discs 18 on a portion 22 of the connecting rod 14 of restricted cross section and bounded outwardly by an annular shoulder 23 against which the discs are pressed by a nut 24 threadedly engaging the connecting rod 14 inwardly of the inner disc.

Separated by the adjusting piston 16 from the central portion 25 of the interior of the housing 9 and contained axially or longitudinally of the casing between the adjusting piston and the adjoining cap 12 is an adjusting chamber 26 which, with the connecting rod 14 and piston 16, forms the adjusting unit of the slack adjuster. In the illustrated embodiment, the adjusting chamber is interrupted centrally adjacent its outer end by an annular abutment or inner projection 27 of the cap 12 against which the adjusting piston 16 is adapted to abut to limit the outward movement of the connecting rod 14 relative to the housing. To ensure that this end of the housing 9 is sealed against moisture, dust or other foreign matter, it is preferred to enclose the connecting rod 14 outwardly of the housing in part by a bellows-type boot 28 of sufficient length to encompass the permissive telescoping or reciprocable movement of the connecting rod relative to the housing, the boot being anchored at its inner end to a sleeve 29 threaded into the outer end of the cap 12.

The power unit of the slack adjuster is conveniently contained in the end of the housing 9 opposite that containing the adjusting piston 16 and chamber 26 of the adjusting unit. The power unit also encloses a piston, here, for fluid actuation, in the form of a double headed power piston 30 having a pair of axially spaced heads, the inner 31 of which slides on the inner wall 17 of the housing 9 and the outer 32 of which is of relatively reduced cross section and slides or reciprocates in a central or axial bore 33 in the cap 10 at that end of the casing, these heads 31 and 32 preferably being made in the same manner as the adjusting piston 16 and mounted in like fashion on their common piston rod or stem 34. The bore 33 in the cap 10 is closed at its outer end and between its outer end wall 35 and the smaller or adjoining head 32 of the double headed power piston 30 contains a power chamber 36. The inner end of the bore 33 is closed by a plug 37 threaded into the inwardly projecting portion 38 of the cap 10 containing the bore, the plug having a central aperture 39 through which extends the piston rod 34. For fluid actuation of the power piston, there is contained in the housing between the inner or larger head 31 of the piston 30 and the inner end of the cap 10, another chamber, hereinafter termed an "actuating" chamber 40. The intermediate portion 25 of the housing between the adjusting piston 16 and the power piston 30 of the adjusting and power units, respectively, conveniently serves as the third basic unit of the slack adjuster, the reservoir for oil or like non-corrosive liquid, and also contains the yieldable means opposing movement of each of the two pistons under the force of fluid pressure, this yieldable means here being in the form of a single main coil spring 41 acting at its opposite ends against inner or confronting ends of the two pistons and yieldably resisting their inward movement relative to the housing and each other.

The actuating chamber 40, through an open passage or conduit 42 in the adjoining cap 10 and connected flexible piping 43, is connected to an orifice or port 44 interrupting the side wall 45 of the brake cylinder 5, intermediate its ends and normally blocked from line pressure admitted to the brake cylinder through the feed pipe 46 by the brake piston 4. Axially of the brake cylinder 5, the orifice 44 is positioned such that it will continue to be blocked from line pressure on shifting of the brake piston against the force of the associated return spring 47 on a brake application with the slack at normal but will be exposed to line pressure when the brake piston shifts beyond normal due to excess slack, the term "normal" as here used denoting a predetermined limit within the A.A.R. permissive brake piston stroke range of 7" to 8". As a consequence, when and only when slack in the brake rigging is excessive, line pressure will be admitted to the actuating chamber 40 and shift the power piston 30 upwardly against the yieldable resistance of the main spring 41. Were the actuation mechanical, as by a lost motion connection between the power piston and the brake piston, the shift of the power piston would be limited by the difference between the normal stroke of the brake piston and the stroke required to take up the excess slack then existing in the brake rigging. However, under the same condition of excess slack, a power-actuating piston would continue to shift under line pressure for the duration of the brake application. It is therefore necessary in such case to limit the travel of the power piston so that an increment of excess slack will be taken up on each brake application, this if greatly excess slack suddenly develops, as by the loss of one or more brake shoes, necessitating several brake applications before the excess is fully taken up.

The desired limited shifting of the power piston under fluid actuation is obtained in the illustrated embodiment by disposing in the path of the piston a limit stop, here in the form of the centrally-apertured plug 37 closing the inner end of the bore 33 in the cap 10 and through which the piston rod 34 of the power piston extends, the plug normally being axially spaced from the outer head 32 and being abuttable thereby to limit the stroke of the power piston. In order to utilize this predetermined limited movement of the piston whenever on a brake application the slack is excessive, to take up that excess slack, a plurality of connections is provided for interchange of liquid between the reservoir 25 and the adjusting and power chambers 26 and 36. The necessary connections are reduced to a minimum in the illustrated embodiment by employing a common pipe 48 to connect both the adjusting and power chambers 26 and 36 to the reservoir 25, access through this pipe to the adjusting chamber normally being blocked by a release valve 49 and to the power chamber normally being permitted by a one-way or non-return spring-pressed ball or like valve 50. The power and adjusting chambers also are directly connected by a pipe 51 bypassing the reservoir 25, flow through this pipe, except from the power chamber to the adjusting chamber being blocked by a one-way valve 52.

With the above connections and the reservoir 25 and adjusting and power chambers 26 and 36 initially filled with oil or like liquid through suitable, normally plugged, filler ports 25a, 26a and 36a, respectively, shifting of the power piston 30 to its inner limit will suck fluid from the reservoir 25 into the power chamber 36 through the pipe 48 and the one-way valve 50, thus filling that chamber with an expellable charge of fluid whenever the slack in the brake rigging is excessive. Resistance to such flow by back pressure in the reservoir is prevented by providing the latter with a combined breather and filler plug 53 open to the atmosphere, the breather having its outlet 54 protected against foreign matter from the outside by a screen 55. Also, the breather 53 preferably is mounted on top of the housing 9 and contains a floating valve plug 56 perforated for the passage of air, the valve plug, if the car on which the slack adjuster is installed is turned over, as in dumping, dropping by gravity to close the outlet 54.

On subsequent release of the brakes (not shown), the pressure in the actuating chamber 40 will be restored to atmospheric by the bleeding of the line pressure back through the conduit 42, piping 43 and orifice 44 and the usual screened breather port 57 in the brake cylinder 5, this action occurring after the brake piston 4 has returned toward normal position sufficiently to block the orifice 44 from the feed pipe 46 and open it to the breather port 57. On release of the pressure within the actuating chamber 40, the main spring 41 comes into play to shift the piston 30 outwardly and restore it to normal position. During this shift, the outer head 32 of the power piston acts to force the charge of liquid from the power chamber through the one-way valve 52 and pipe 51 into the adjusting chamber 26 and displace the adjusting piston 16 a related distance inwardly, correspondingly reducing the length of the linkage between the cylinder and floating levers 1 and 2 and thus the slack in the brake rigging. As previously mentioned, this incremental shifting of the adjusting piston 16 will continue on subsequent brake applications until the slack has been restored to normal, the adjusting piston being displaced each time a distance determined by the volume of the charge and the free cross-section of the adjusting chamber 26.

The above structure suffices alone automatically to take up slack and if this is all that is desired, the release valve 49 may simply be a manually operated needle or other shut-off valve provided for the purpose of enabling the pipe 48 to be opened so as to permit flow of liquid therethrough from the adjusting chamber 26 back to the reservoir 25 when it is necessary to pay off slack, as in the application of a full set of brake shoes. However, it is preferred that the slack adjuster be capable of paying out as well as taking up slack automatically. The automatic paying out when the slack in the brake rigging is below normal is here accomplished by employing as the release valve 49, in place of a simple manually operated shut-off valve, a fluid pressure actuated valve having a valve body 58 conveniently mountable on the cap 12 at the actuating unit end of the housing 9 and connected in the line 48 with a valve element or member 59 normally seating in a seat 60 in that line, the valve being one-way with its valve element 59 displaceable against the yieldable resistance of a spring 61 only by pressure from the adjusting chamber 26. The spring 61 seats in a chamber or enlarged axial bore 62 in the valve body 58 and acts directly against a piston 63 reciprocable in the bore 62 and fixed to the stem 64 of the valve element 59.

Between its outer end 65 and the piston 63, the bore is connected through a port 66 in the valve body 58 by a line 67 of flexible tubing or piping to a port 68 interrupting the side wall 45 of the brake cylinder 5 intermediate the feed pipe 46 and orifice 44 and slightly in advance of the latter. With the port 68 so situated, a normal stroke of the brake piston 4 will open it to line pressure prior to the application of that pressure on the power piston 30 through the orifice 44. As a consequence, at the time that the power piston is actuated, the valve element 59 will be held seated in its seat 60 by the application of line pressure through the line 67 and port 66 against the underside of the piston 63 and, by preventing escape of fluid from the adjusting chamber 26, effectively lock the adjusting piston against displacement outwardly of the housing 9. If, on the other hand, the slack in the brake rigging is below normal so that the stroke of the brake piston 4 is insufficient to open the port 68 to line pressure, unseating of the valve element 59 after the brakes have been applied will be resisted only by the spring 61. The brake application applying a force tending to lengthen the linkage between the brake levers 1 and 2 by outward displacement of the adjusting piston 16 relative to the housing 9, the resultant force applied by the adjusting piston on the liquid within the adjusting chamber 26 will unseat the valve element 59 against the resistance of its spring 61 and cause liquid to flow or bleed back through the line 48 to the reservoir 25 until the linkage, and thus the slack, has been restored to normal. To enable the valve element 59 to be actuated manually when, in the absence of line pressure, paying out of slack is needed, as for the installation of a set of brake shoes, the release valve 49 is provided with a plunger 69 rigid with the stem 64 of the valve element 59, the plunger projecting outwardly through the outer end 65 of the valve body 58 and carrying therebeyond a knob 70 for manual actuation, so that the valve element 59 can be unseated and thus permit shifting of the adjusting piston 16 simply by pulling outwardly on the knob 70 against the force of the spring 59.

From the above detailed description, it will be apparent that there has been provided an improved automatic hydraulic slack adjuster which is practically trouble-free in operation and capable of both taking up and paying out slack as needed to return the slack in the brake rigging to normal. It will be understood that the described and disclosed embodiment is merely exemplary of the invention and that all modifications are intended to be included which do not depart from either the spirit of the invention or the scope of the appended claims.

Having described the invention, what is claimed as new and useful is:

1. In a railway brake rigging, the combination with a pair of brake levers and a brake cylinder, of an automatic hydraulic slack adjuster comprising adjusting means in a linkage between said brake levers, power means having a non-return fluid connection to said adjusting means and a connection to said brake cylinder, a liquid reservoir having a non-return fluid connection to said power means, said power means being actuated through said brake cylinder connection only on a brake application shifting a brake piston in said brake cylinder beyond a predetermined limit and then drawing a charge of liquid from said reservoir, and means acting on said power means on subsequent release of brakes for impressing said charge on said adjusting means to shorten the linkage between said brake levers.

2. In a railway brake rigging, the combination with a pair of brake levers and a brake cylinder, of an automatic hydraulic slack adjuster comprising adjusting means in a linkage between said brake levers, power means having a non-return fluid connection to said adjusting means, a liquid reservoir having a non-return fluid connection to said power means, lost motion means connecting said power means and a piston in said brake cylinder and effective on a brake application after a predetermined travel of said piston for causing said power means to draw a liquid charge from said reservoir, and means yieldably opposing said action of said power means, said power means when charged and on subsequent release of brakes being urged by said yieldable means to impress said charge on said adjusting means and shorten the linkage between said brake levers.

3. In a railway brake rigging, the combination with a pair of brake levers and a brake cylinder, of an automatic hydraulic slack adjuster comprising adjusting means in a linkage between said brake levers, power means having a non-return fluid connection to said adjusting means, a liquid reservoir having a non-return fluid connection to said power means, and lost motion means connecting said power means and a piston in said brake cylinder and effective on a brake application after a predetermined travel of said piston for causing said power means to be actuated and draws a liquid charge thereto from said reservoir, means yieldably opposing said actuation of said power means, said power means when charged on subsequent release of brakes being urged by said yieldable means to impress said charge on said adjusting means and shorten the linkage between said brake levers.

4. In a railway brake rigging, the combination with a pair of brake levers and a brake cylinder, of an automatic hydraulic slack adjuster comprising adjusting means in a linkage between said brake levers, power means having a non-return fluid connection to said adjusting means and connected to said brake cylinder, a liquid reservoir fluid-connected to said adjusting means and having a non-return fluid connection to said power means, said power means being responsive to the stroke of a piston in said brake cylinder on a brake application only when said stroke exceeds a predetermined limit for drawing a liquid charge from said reservoir, means acting on said power means on subsequent release of the brakes for improving said charge on said adjusting means to shorten said linkage, and valve means in the fluid connection between said adjusting means and reservoir and responsive to movement of said piston for blocking flow through said connection except when the stroke of said piston is less than said predetermined limit, said valve means on said less stroke of said piston being yieldable to an external force applied thereto through said adjusting means for bleeding liquid therefrom to said reservoir to lengthen said linkage.

5. In a railway brake rigging, the combination with a pair of brake levers and a brake cylinder, of an automatic hydraulic slack adjuster comprising adjusting means in a linkage between said brake levers and including a piston and a chamber, power means including a chamber having a non-return fluid connection to said adjusting chamber and a piston, a liquid reservoir having a non-return fluid connection to said power chamber, said power piston being connected to said brake cylinder and therethrough being shifted in response to a greater than normal stroke of a piston in said cylinder on a brake application to draw a liquid charge from said reservoir in to said power chamber, and means opposing said shifting of said power piston, said power piston on subsequent release of brakes and under force of said opposing means impressing said charge on said adjusting chamber and by shifting of said adjusting piston shortening said linkage.

6. In a railway brake rigging, the combination with a pair of brake levers and a brake cylinder, of an automatic hydraulic slack adjuster comprising adjusting means in a linkage between said brake levers and including a piston and a chamber, a liquid reservoir fluid-connected to said adjusting chamber, and means operative in response to a greater than normal stroke of a piston in said brake cylinder for impressing a metered liquid charge on and shifting said adjusting piston to shorten said linkage, and valve means in the fluid connection between said reservoir and adjusting chamber and responsive to movement of said brake piston for blocking flow through said connection except on a less than normal stroke of said brake piston, said valve means on said less than normal stroke of said brake piston being yieldable to an external force applied thereto through said adjusting piston for bleeding said liquid charge from said adjusting chamber to said reservoir and thereby enabling said adjusting piston to shift and lengthen said linkage.

7. In a railway brake rigging, the combination with a pair of brake levers and a brake cylinder, of an automatic hydraulic slack adjuster comprising housed adjusting and power means, each including a spring-pressed piston and a chamber, a non-return fluid connection from said power chamber to said adjusting chamber, said adjusting means being connected in a linkage between a pair of brake levers, and a liquid reservoir having a non-return fluid connection to said power chamber, said power piston being connected to said brake cylinder for actuation by line pressure in response only to a greater than normal stroke of a brake piston within said brake cylinder on a brake application for drawing a liquid charge from said reservoir into said power chamber, and said power piston on subsequent release of brakes being urged by spring means to pass said charge to said adjusting chamber and thereby shift said adjusting piston to shorten said linkage.

8. In a railway brake rigging, the combination with a pair of brake levers and a brake cylinder, of an automatic hydraulic slack adjuster comprising a housing connected at one end to one of said brake levers, an adjusting unit in an opposite end of said housing and including an adjusting piston and chamber, said adjusting piston being connected by rod means extending through said opposite end to said other brake lever, a power unit including a power piston and chamber in said one end of said housing, a liquid reservoir in said housing intermediate said pistons and spring means between and normally urging said pistons apart, said reservoir being fluid-connected to said power chamber through a non-return valve and said power chamber being fluid-connected to said adjusting chamber through a non-return valve, and a fluid connection between said brake cylinder and housing for applying line pressure to said power piston on a brake application requiring a greater than normal stroke of a brake piston in said brake cylinder for drawing a charge from said reservoir into said power chamber, said power piston on subsequent release of brakes and under force of said spring forcing said charge into said adjusting chamber and thereby shifting said adjusting piston to shorten said linkage.

9. In a railway brake rigging, the combination with a pair of brake levers and a brake cylinder, of an automatic hydraulic slack adjuster comprising a housing connected at one end to one of said brake levers, an adjusting unit in an opposite end of said housing and including an adjusting piston and chamber, said adjusting piston being connected by rod means extending through said opposite end to said other brake lever, a power unit including a power piston having a pair of heads each riding in one of a pair of axially spaced chambers, a liquid reservoir in said housing between said pistons and having a non-return fluid connection to one of said power unit chambers, a non-return fluid connection from said one power unit chamber to said adjusting chamber, and a fluid connection between said brake cylinder and the other of said power unit chambers for applying line pressure through said last-named chamber to the related of said heads of said power piston, said power piston on application of line pressure to said last-named head shifting in response to said pressure and drawing a liquid charge from said reservoir into the other of said power unit chambers, and said power piston on subsequent release of brakes and under force of said spring forcing said charge into said adjusting chamber and thereby shifting said adjusting piston to shorten said linkage.

10. In a railway brake rigging, the combination with a pair of brake levers and a brake cylinder, of an automatic hydraulic slack adjuster comprising a housing connected at one end to one of said brake levers, an adjusting unit in an opposite end of said housing and including an adjusting piston and chamber, said adjusting piston being connected by rod means extending through said opposite end to said other brake lever, and a power unit including a power piston having a pair of heads, each riding in one of a pair of axially spaced chambers, a liquid reservoir in said housing between said pistons and having a non-return fluid connection to one of power unit chambers, a non-return fluid connection from said one power unit chamber to said adjusting chamber, the other of said power unit chambers being fluid-connected to a port in a side of said brake cylinder normally blocked by a brake piston therein from a feed port thereof, said power piston on a brake application shifting said brake piston beyond said port being shifted by line pressure to draw a liquid charge from said reservoir into the other of said power unit chambers, and said power piston on subsequent release of the brakes being urged by said spring means to force said liquid charge into said adjusting chamber and thereby shorten the linkage between said brake levers.

11. In a railway brake rigging, the combination with a pair of brake levers and a brake cylinder, of an automatic hydraulic slack adjuster comprising a housing pivotally connected at one end to one of said brake levers, an adjusting unit in an opposite end of said housing and including an adjusting piston and chamber, said adjusting piston being connected by rod means extending through said opposite end to the other of said brake levers, a power unit in said one end of said housing and including a power piston having a pair of heads each riding in one of a pair of axially spaced chambers, a liquid reservoir in said housing intermediate said pistons and fluid-connected to said adjusting chamber and having a non-return fluid connection to one of said chambers of said power unit, a non-return fluid connection directly from said one chamber to said adjusting chamber, a flexible fluid connection between the other of said power unit chambers and a port in a side of said brake cylinder normally blocked by a brake piston therein from a feed port thereof, a yieldable valve in the fluid connection between and normally blocking flow from said adjusting chamber to said reservoir, and a flexible fluid connection between said valve and a port in a side of said brake cylinder intermediate said first-named and feed ports for applying line pressure to said valve in a direction to hold said valve closed, said last-named port being normally blocked by said brake piston from said feed port, said brake piston on being shifted during a brake application beyond said ports in the side of said brake cylinder enabling line pressure to be applied first to said valve to hold said valve closed and thereafter to said power piston to shift said piston and draw a liquid charge from said reservoir into the chamber of said power unit connected thereto, and spring means opposing said shifting of said power piston, said power piston on subsequent release of the brakes being urged by said spring means to force said charge into said adjusting chamber and by shifting said adjusting piston shorten the linkage between said brake levers, and said adjusting piston on a brake application shifting said brake piston less than the distance to said side ports being actuated to force said valve open and bleed liquid therethrough to said reservoir to lengthen said linkage.

12. In a railway brake rigging, the combination with a pair of brake levers and a brake cylinder, of an automatic hydraulic slack adjuster comprising housed adjusting and power units each including a piston and a chamber, said adjusting unit being connected in a linkage between a pair of brake levers, a liquid reservoir having a non-return fluid connection to said power chamber, a non-return fluid connection from said power chamber directly to said adjusting chamber, a flexible fluid line connecting said power unit for actuation by line pressure to a port in a side of said brake cylinder normally blocked by a brake piston therein from a feed port thereof, said power piston on a brake application shifting said brake piston beyond said port being actuated by line pressure to draw a liquid charge from said reservoir into said power chamber, means for limiting said shifting of said power piston, and spring means yieldably resisting said shifting of said power piston, said power piston on subsequent release of brakes and under force of said spring means passing said charge to said adjusting chamber and thereby shifting said adjusting piston to shorten said linkage.

13. In a brake rigging, the combination with a brake cylinder and a pair of brake levers, of an automatic hydraulic slack adjuster comprising adjusting means connected in a linkage between a pair of brake levers and including a piston connected to one of said levers and a chamber interposed between said piston and connected lever, power means including a piston shiftable independently of said levers and a chamber fluid-connected to said brake cylinder and having a non-return fluid connection directly to said adjusting unit, a liquid reservoir having a non-return fluid connection to said power chamber, said power piston being shiftable in response to a predetermined travel of a brake piston in said brake cylinder to draw a liquid charge from said reservoir into said power chamber, and means operative on subsequent release of brakes for shifting said power piston to initial position and thereby impressing said charge on said adjusting piston to shorten said linkage.

14. In a brake rigging, the combination with a brake cylinder and a pair of brake levers, of an automatic hydraulic slack adjuster comprising adjusting means connected in a linkage between a pair of brake levers and including a piston connected to one of said levers and a chamber interposed between said piston and connected lever, power means including a piston shiftable independently of said levers and a chamber fluid-connected to said brake cylinder and having a non-return fluid connection directly to said adjusting unit, a liquid reservoir having a non-return fluid connection to said power chamber, said power piston being shiftable in response to line pressure thereon after a predetermined travel of a brake piston in said brake cylinder to draw a liquid charge from said reservoir into said power chamber, and means operative on subsequent release of brakes for shifting said power piston to initial position and thereby impressing said charge on said adjusting piston to shorten said linkage.

15. In a brake rigging, the combination with a brake cylinder and a pair of brake levers, of an automatic hydraulic slack adjuster comprising housed adjusting means connected in a linkage between a pair of brake levers and including a piston connected to one of said levers and a chamber interposed between said piston and connected lever, power means including a piston shiftable independently of said levers and a chamber fluid-connected to said brake cylinder and having a non-return fluid connection directly to said adjusting unit, a liquid reservoir having a non-return fluid connection to said power chamber, said power piston being shiftable in response to line pressure thereon after a predetermined travel of a brake piston in said brake cylinder to draw a liquid charge from said reservoir into said power chamber, and means operative on subsequent release of brakes for shifting said power piston to initial position and thereby impressing said charge on said adjusting piston to shorten said linkage.

16. In a brake rigging, the combination with a brake cylinder and a pair of brake levers, of an automatic hydraulic slack adjuster comprising housed adjusting means connected in a linkage between a pair of brake levers and including a piston connected to one of said levers and a chamber interposed between said piston and connected lever, power means including a piston shiftable independently of said levers and a chamber fluid-connected to said brake cylinder and having a non-return fluid connection directly to said adjusting unit, a liquid reservoir fluid-connected to said adjusting chamber and having a non-return fluid connection to said power chamber, means normally blocking flow of liquid from said adjusting chamber to said reservoir and locking said adjusting piston against movement in the direction of said connected lever relative to the housing of said adjusting means, said power piston being shiftable in response to a predetermined travel of a brake piston in said brake cylinder to draw a liquid charge from reservoir into said power chamber, and means operative on subsequent release of brakes for shifting said power piston to initial position and thereby impressing said charge on said adjusting piston to shorten said linkage.

17. In a brake rigging, the combination with a brake cylinder and a pair of brake levers, of an automatic hydraulic slack adjuster comprising adjusting means connected in a linkage between said brake levers and including piston means connected to one of said levers, power means having a non-return fluid connection to said adjusting means and including piston means, a reservoir having a non-return fluid connection to said power means, means effective on a brake application with normal slack for locking said adjusting piston means against shifting to lengthen said linkage, and means effective on a brake application with excess slack for shifting said power piston means to draw a charge of liquid from said reservoir, and means acting on said pressure piston means on subsequent release of brakes for impressing said charge on and shifting said adjusting piston means to shorten said linkage.

18. In a brake rigging, the combination with a brake cylinder and a pair of brake levers, of an automatic hydraulic slack adjuster comprising adjusting means connected in a linkage between said brake levers and including piston means connected to one of said levers, power means having a non-return fluid connection to said adjusting means and including piston means, a reservoir having a non-return fluid connection to said power means, means effective on a brake application with normal slack for locking said adjusting piston means against shifting to lengthen said linkage, and means effective on a brake application with excess slack for shifting said power piston means to draw a charge of liquid from said reservoir, and means acting on said pressure piston means on subsequent release of brakes for impressing said charge on and shifting said adjusting piston means to shorten said linkage, said locking means being fluid-releasable on a brake application with insufficient slack and manually releasable in the absence of line pressure for enabling shifting of said adjusting piston means to lengthen said linkage.

No references cited.